United States Patent [19]

Sakamoto

[11] Patent Number: 4,588,225
[45] Date of Patent: May 13, 1986

[54] HEIGHT ADJUSTMENT MECHANISM FOR A VEHICLE SEAT

[75] Inventor: Takao Sakamoto, Akishima, Japan
[73] Assignee: Tachikawa Spring Co., Ltd., Tokyo, Japan
[21] Appl. No.: 595,354
[22] Filed: Mar. 30, 1984
[51] Int. Cl.[4] .............................................. B60N 1/02
[52] U.S. Cl. .................................... 297/346; 297/345; 248/420; 248/423; 296/65 R
[58] Field of Search ................. 297/345, 346; 248/420, 248/423, 222.4; 296/65 R

[56] References Cited

U.S. PATENT DOCUMENTS

| 874,014 | 12/1907 | Kurtzon | 248/222.4 X |
| 975,019 | 11/1910 | Cogger | 297/346 X |
| 1,200,693 | 10/1916 | Barton et al. | 297/346 X |
| 1,568,211 | 1/1926 | Conwell | 297/345 X |
| 1,855,245 | 4/1932 | Kuenzel | 248/423 |
| 2,589,922 | 3/1952 | Bowman | 296/65 R |
| 3,022,976 | 2/1962 | Zia | 296/65 R |
| 3,167,298 | 1/1965 | Senkowski et al. | 248/420 |
| 3,448,820 | 6/1969 | Aiello et al. | 248/420 X |
| 3,841,696 | 10/1974 | Wagner | 248/420 X |

FOREIGN PATENT DOCUMENTS

| 54434 | 6/1936 | Denmark | 248/420 |
| 814561 | 7/1951 | Fed. Rep. of Germany | 296/65 R |

Primary Examiner—William E. Lyddane
Assistant Examiner—Peter A. Aschenbrenner
Attorney, Agent, or Firm—Cushman, Darby & Cushman

[57] ABSTRACT

An improved height adjustment mechanism for a vehicle seat is disclosed which is adapted to incline the entire seat. In this height adjustment mechanism, four plate-like receiving pieces are provided respectively in the four leg rods of a seat frame in such a manner that they are respectively inclined or descend forwardly, and, on the other hand, four support plates are provided in a mounting platform to be fixed to the vehicle in such a manner that they respectively have the same inclined surface as that of the receiving piece, thereby achieving a face engagement between the respective receiving pieces and support plates. Such face engagement allows loads applied to the respective leg rods to be dispersed over the entire mounting platform.

6 Claims, 6 Drawing Figures

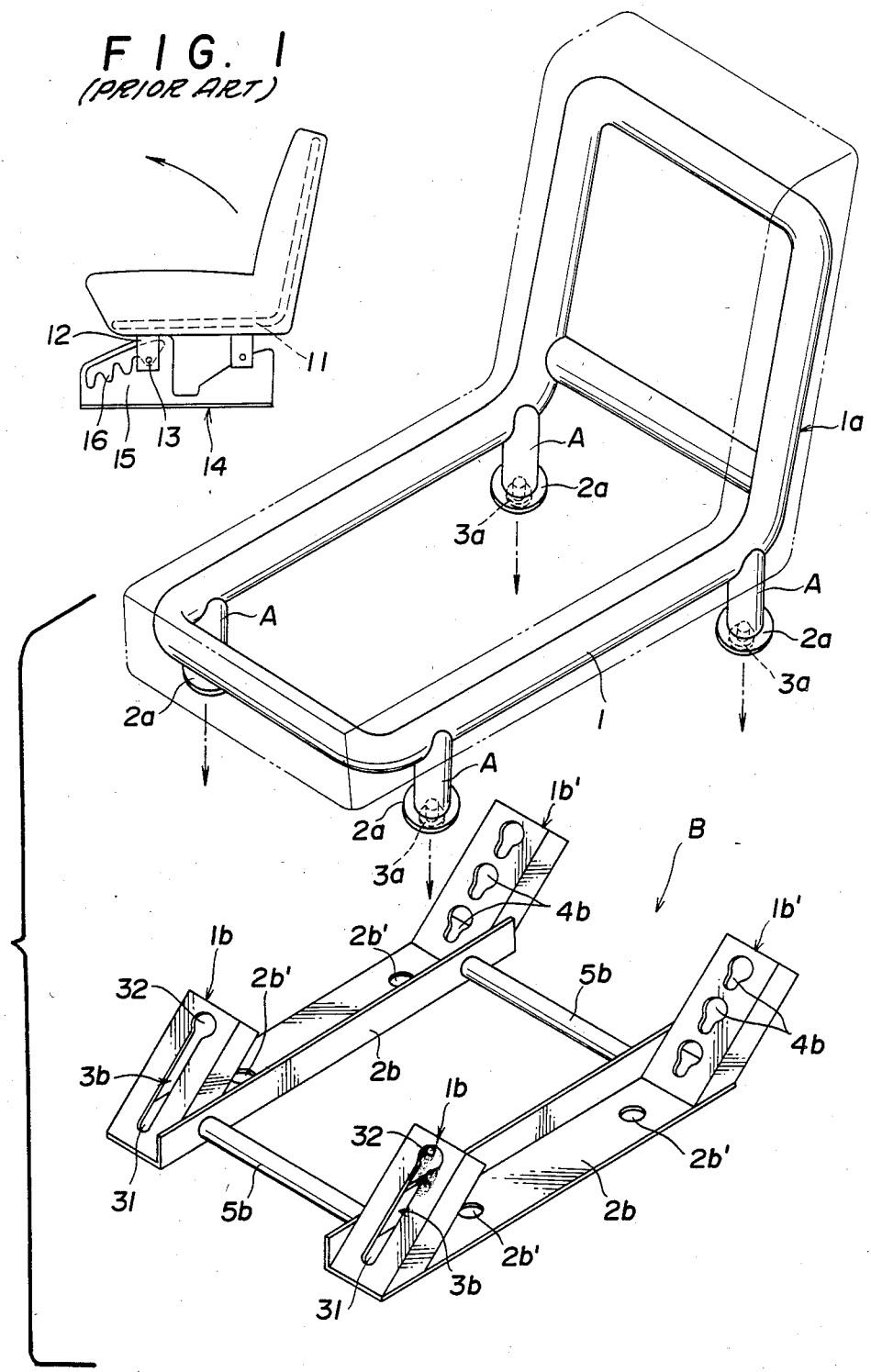

HEIGHT ADJUSTMENT MECHANISM FOR A VEHICLE SEAT

BACKGROUND OF THE INVENTION

1. Field of the Invention

The present invention relates to a height adjustment mechanism for a seat used in an agricultural vehicle such as a combine or in a civil engineering vehicle, and more particularly to an improved height adjustment mechanism for such vehicle seat whereby the entire seat can be inclined forwardly.

2. Description of the Prior Art

A conventional seat of this type, as shown in FIG. 1, comprises a seat frame (11), two leg members (12) fixed respectively to the right and left front portions of the bottom surface of the seat frame (11), an engagement pin (13) fixed horizontally to the lower ends of the two leg members, and a support plate (15) provided in and extending vertically from a mounting platform (14) on a vehicle floor and also having a plurality of concavely notched engagement bores (16). The engagement pin (13) can thus be engaged with one of the engagement bores (16) to secure the seat frame to the vehicle floor.

Accordingly, in the above-mentioned conventional seat, to clean the surface of the vehicle body located below the seat, the seat must be inclined forwardly about the leg members (12) in the front portions of the seat frame. This means, however, that the entire loads of the seat are applied to the engagement pin (13) which may be bent or deformed, resulting in the failure of the height adjustment of the seat.

SUMMARY OF THE INVENTION

The present invention aims at eliminating the drawbacks in the above-mentioned conventional device and provides herein two embodiments of an improved height adjustment mechanism constructed in accordance with the invention.

It is an object of the invention to provide an improved height adjustment mechanism which is capable of distributing loads applied to leg rods of a seat over the entire mounting platform so as to eliminate the drawbacks in the abovementioned prior art device.

In accomplishing this object, according to the invention, each leg rod is provided in its lower end with a receiving piece having an inclined surface of the same angle as that of an inclined support plate provided in the mounting platform and this receiving piece can be brought into contact with the support plate in a face-to-face manner. This face-to-face contact between the receiving piece and the support plate prevents loads applied to the leg rod from being centralized onto its local portion as is the case in the conventional device.

Another object of the invention is to provide an improved height adjustment mechanism which allows the whole seat to be inclined forwardly with ease.

To attain this object, according to the invention, each of the front leg rods is provided with a curved receiving piece about which the seat can be inclined forwardly. In other words, use of the curved receiving piece permits the forward inclination of the seat with a substantially smaller force.

Still another object of the invention is to provide an improved height adjustment mechanism which enables the seat to be removed from a mounting platform fixed to a floor of a vehicle body so as to facilitate the cleaning of the vehicle floor.

For this purpose, according to the invention, an engagement pin provided on the bottom surface of the receiving piece is adapted to be removable from its associated engagement bore formed in the support plate.

BRIEF DESCRIPTION OF THE DRAWINGS

FIG. 1 is a side view of a conventional device;

FIG. 2 is an exploded, perspective view of a height adjustment mechanism constructed in accordance with the invention;

DETAILED DESCRIPTION OF PREFERRED EMBODIMENTS OF THE INVENTION

Figure 3:
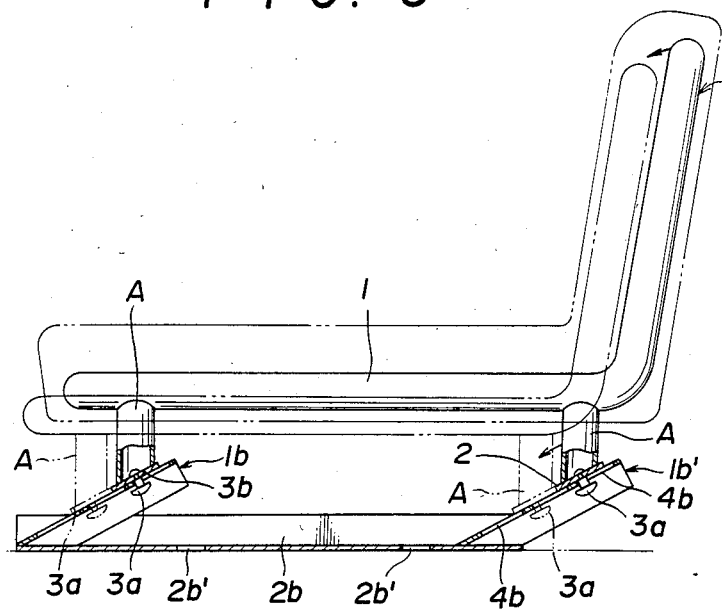
FIG. 3 is a partially cutaway, side view of the same in FIG. 2 when it is mounted in place.

FIGS. 2 and 3 illustrate a first embodiment of a height adjustment mechanism constructed in accordance with the present invention. In the drawings, reference character (A) designates a leg rod and there are arranged four leg rods in the present height adjustment mechanism as shown in the figures. Each of the leg rods (A) is provided on and suspended vertically from the bottom surface of a seat frame (1), and is also equipped in its lower end with a disk-like receiving piece (2a) having an inclined or forwardly descending bottom surface and an engagement pin (3a) provided on and projected from the bottom surface of the receiving piece (2a). Thus, the leg rods (A) respectively are removably connected with a mounting platform (B) provided on a vehicle body floor.

The above-mentioned seat frame (1) is a closed-loop frame having a rectangular-shaped plane, and the closed-loop frame illustrated is extended integrally with a diagonally and upwardly curved back frame (1a) which forms a back-rest portion of a seat.

Each of the leg rods (A)—is welded vertically to one of four portions, that is, front right and left portions as well as rear right and left portions, of a lower surface of a foam forming a sitting part of the seat frame (1). The receiving piece (2a) is fixed to the lower end of the above-mentioned leg rod (A) by welding or the like in such a manner that it descends forwardly or is inclined at the same angles as those of a support plate (1b) to be described later.

The engagement pin (3a), which has a head portion at its top end, is provided centrally of the bottom surface of the receiving piece (2a) substantially at right angles relative to the inclined surface thereof and is also adapted to be engaged into an engagement bore (4b) of the support plate (1b).

In the drawings, (B) represents a mounting platform which is fixed to the vehicle floor below the seat frame (1) by bolts or the like and also which is provided with four support plates (1b), (1b') with the former two support plates (1b) being located in its front right and left portions and the latter two support plates (1b') in its rear right and left portions. Each of the support plates has a flat surface which faces upwardly and is inclined similarly to the inclined surface of the receiving piece (2a) so as to be engaged with the receiving piece inclined surface.

The front and rear support plates (1b) and (1b') are respectively provided in the front and rear portions of each of mounting plates (2b),(2b) both of which are disposed in the longitudinal direction of the vehicle. Each of the front support plates (1b) is formed in its longitudinal direction with an elongated guide bore (3b) which comprises an elongated bore portion (31) and a larger diameter bore portion (32) located at the upper end of the elongated bore portion (31). On the other hand, each of the rear support plates (1b') is formed with a plurality of properly-spaced, multi-stepwise engagement bores (4b),(4b)—each of which has an upper portion larger in diameter than the head portion of the engagement pin (3a) and a lower portion smaller in diameter than the same head portion.

Also, since the larger diameter portion (32) of the elongated guide bore (3b) is formed to be larger than the head portion of the engagement pin (3a) and the elongated portion (31) of the same is narrower than the same head portion, the engagement pin (3a) is permitted to escape from the larger diameter bore portion (32) but is prevented from slipping away from the elongated bore portion (31).

In the drawings, (5b),(5b) designate connection pipes respectively for connecting the right and left mounting plates (2b),(2b) with each other, and (2b')(2b') denote mounting bores respectively all of which serve to fix the mounting platform (B) to the vehicle floor.

Accordingly, if the engagement pins (3a) of the receiving pieces (2a) provided in the lower ends of the four leg rods (A)(A)—are inserted into their respective elongated guide bores (3b) and desired engagement bores (4b) formed in the inclined surfaces of the front right and left support plates (1b) and the rear right and left support plates (1b'), then the seat frame (1) is mounted onto the mounting platform (B). Since the seat frame (1) can be removed from the mounting platform (B) by moving it upwardly, it is possible to adjust the height of the seat by inserting the engagement pins (3a) of the rear leg rods (A) into the desired engagement bores (4b)(4b) of the rear support plates (1b'). Also, since these engagement pins (3a) are respectively engaged with the respective back sides of the engagement bores (4b) and the elongated guide bores (3b) formed in the support plate (1b) and (1b'), the seat is prevented from inclining forwardly.

Further, after the seat is moved backwardly and then the head portions of the engagement pins (3a) are positioned respectively within the larger diameter bore portion (32) of the elongated guide bores (3b) of the support plate (1b) and the larger diameter portions of the engagement bores (4b) of the support plate (1b'), if the seat is lifted upwardly, then the seat can be completely removed from the mounting platform (B) and thus the surface of the vehicle body for mounting the seat can be easily cleaned to remove dirt or the like therefrom.

Figure 4:
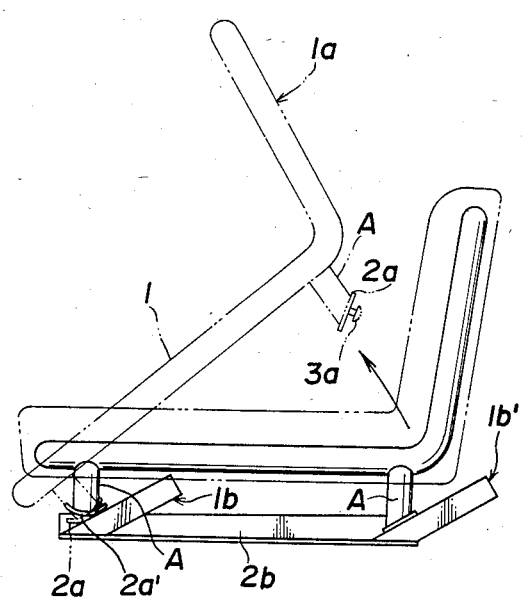
FIG. 4 is a side view of a second embodiment of the invention in which front receiving pieces are formed in a curved or arc-shaped configuration respectively.
Figure 5:
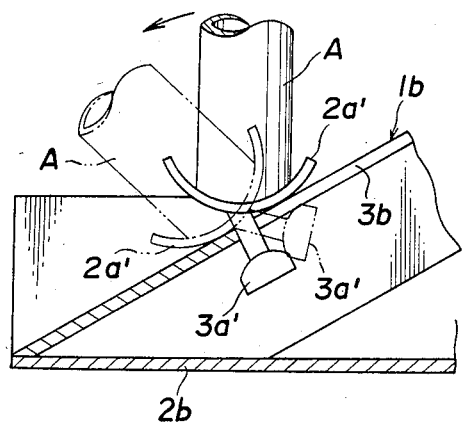
FIG. 5 is a partially cutaway, enlarged view of the main portions of the second embodiment; and, FIG. 6 is an enlarged, plan view of a modification of the two embodiments in which engagement bores are formed in a different configuration respectively.

Referring now to FIGS. 4 and 5, there is illustrated another embodiment of the invention in which each of the receiving pieces (2a) provided in the front leg rods (A) in the first embodiment is modified to form an arc-shaped receiving piece (2a') extending longitudinally of the vehicle and also in which each of the surfaces of the head portions of the engagement pins (3a') provided in the bottom portions of such receiving pieces (2a') to be brought into contact with each of the surfaces of the support plates (1b) is modified to form an arc-shaped surface.

According to the second embodiment of the invention, if the rear engagement pins (3a) are disengaged from their respective engagement bores (4b) and then the seat is moved forwardly, the seat is inclined forwardly about the front receiving pieces (2a'). As a result of this, it is possible to clean the vehicle body surface for mounting the seat without removing the seat from the mounting platform (B).

Figure 6:
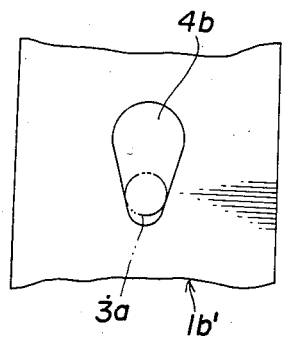

FIG. 6 illustrates a modification of the two prior embodiments of the invention in which each of the engagement bores (4b) is formed to have a substantially inverted-triangular plane and also comprises a larger diameter bore greater in diameter than the head portion of the engagement pin (3a) in its upper portion and a smaller diameter bore shorter in diameter than the shaft portion of the engagement pin (3a) in its lower portion. With this structure, the shaft portion of the engagement pin (3a), when loads are applied thereto, is caused to move downwardly and thus the engagement pin (3a) is abutted against the lower edge portion of the associated engagement bore (4b), so that the seat can be mounted and fixed to the mounting platform (B) more positively.

As can be clearly understood from the foregoing description, according to the invention, loads applied to the seat or the like are to be borne by the receiving pieces respectively provided in the lower ends of the leg rods without allowing only the engagement pins to carry such loads as in the conventional device. In other words, with the invention, since such loads are received by means of surfaces, the support members are prevented from deforming. Therefore, the present invention provides a longer life than that of the conventional device.

What is claimed is:

1. A height adjustment mechanism for a vehicle seat comprising:
   a support frame adapted to be rigidly fixed to a floor of the vehicle and including first and second pairs of support plates upwardly extending from said support frame, each support plate including means defining a load bearing surface which is downwardly and forwardly inclined relative to horizontal,
   said pair of first support plates including means defining plural pairs of apertures spaced-apart relative to one another in a longitudinal direction of said vehicle seat, each said aperture pair for establishing a respective mounting position of said vehicle seat which corresponds to a predetermined mounting height thereof,
   said second pair of support plates including means defining a pair of guide grooves elongated in the longitudinal direction of the vehicle seat; and
   a seat frame including first and second pairs of leg members dependently rigidly fixed to said seat frame, each said leg member terminating in a receiving plate and an engagement pin extending substantially perpendicular to said receiving plate, each said receiving plate including means defining a load-transfer surface, at least said load transfer surfaces of said first pair of receiving plates being planar and inclined downwardly and forwardly relative to horizontal so as to conform to the downward and forward incline of said first pair of support plates, said engagement pins of said second pair of leg members being respectively slidably received by said pair of elongated grooves and said engagement pins of said first pair of leg members being respectively received in a predetermined pair of said apertures such that said engagement pins of said second pair of leg members slide within said pair of elongated grooves when said first pair of engagement pins are removed from said predetermined pair of said apertures and engaged with another pair of said apertures, whereby the height of said seat is adjusted, said load-transfer surfaces of said at least first pair of receiving plates and said load-bearing surfaces of said first pair of support plates being in confronting bearing contact with one another when said seat is in a selected said mounting position to thereby together form means for distributing loads applied to said leg members over said support frame to prevent said loads from being centralized upon said leg members.

2. A height adjustment mechanism as in claim 1 wherein each said first and second pairs of receiving plates define said planar inclined load-transfer surface.

3. A height adjustment mechanism as in claim 1 wherein said load-transfer surface of said second pair of receiving plates is arcuate and is in bearing contact with said load-bearing surfaces of said second pair of support plates to permit said seat frame to be pivoted thereabout.

4. A height adjustment mechanism as in claim 1 wherein said first pair of leg members constitute a rear pair of leg members and wherein said second pair of leg members constitute a front pair of leg members.

5. A height adjustment mechanism as in claim 1 wherein each said engagement pin has a head portion of a predetermined diameter and wherein each of said apertures include an upper portion formed larger in diameter than the predetermined diameter of said head portion and a lower portion formed smaller in diameter than said predetermined diameter of said head portion of said engagement pin.

6. A vehicle seat comprising a seat frame including front and rear pairs of leg members, a support frame adapted to be rigidly fixed to a vehicle floor for supporting said seat frame, and height-adjustment means for adjusting mounting heights of said seat frame relative to said support frame, said height-adjustment means including:

(a) front and rear pairs of support plates fixed to said support frame so as to be in registry with said front and rear pairs of leg members, respectively, and each defining a planar load-bearing surface which is downwardly and forwardly inclined relative to horizontal, (b) said front pair of support plates defining a respective pair of elongated guide grooves extending in a longitudinal direction of the vehicle seat;

(c) said rear pair of support plates defining respective plural pairs of mounting apertures spaced apart in said longitudinal direction to establish respective mounting positions and thus mounting heights of said seat frame relative to said support frame;

(d) said rear pair of leg members each including a rear receiving plate having means defining a planar load-transfer surface confrontingly engaged with a respective one of said load-bearing surfaces of said rear pair of support plates and inclined relative to horizontal so as to conform to said inclined load-bearing surfaces of said rear pair of support plates;

(e) front and rear pairs of mounting pins respectively engaged with said pair of elongated grooves and a predetermined pair of said mounting apertures;

(f) said front pair of leg means each including a front receiving plate including means defining an arcuate surface in bearing contact with said planar load-bearing surfaces of said front pair of support plates, (g) said means defining an arcuate surface of each said front pair of leg members for permitting said seat frame to pivot thereabout while said front pair of mounting pins are engaged in said pair of mounting grooves when said rear pair of mounting pins are disengaged from said predetermined pair of mounting apertures such that said front pair of mounting pins are slidably moved in said elongated grooves until said rear pair of mounting pins are again engaged with another pair of said mounting apertures, thereby adjusting the height of said seat frame relative to said support frame.

* * * * *